United States Patent Office 3,310,501
Patented Mar. 21, 1967

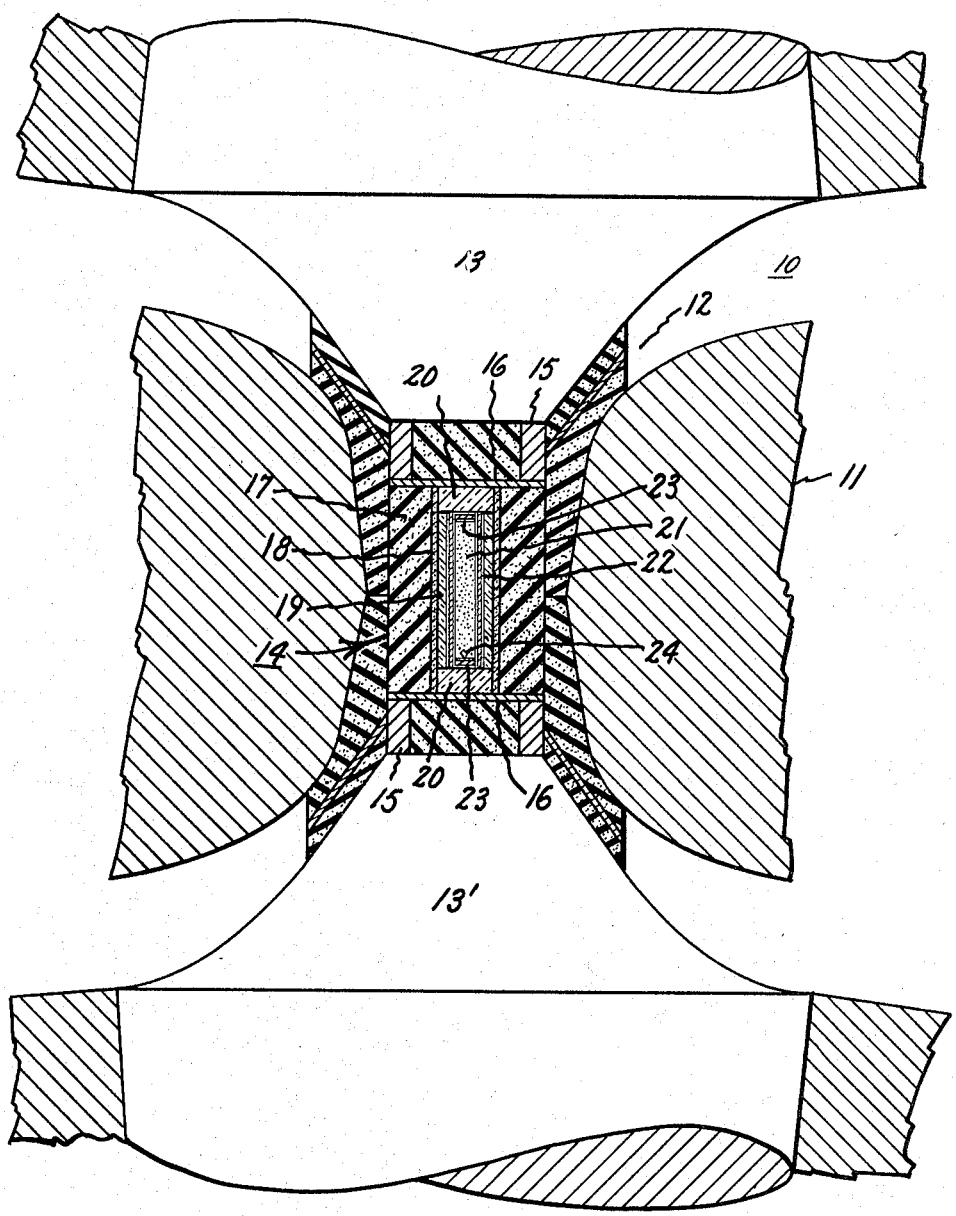

3,310,501
PREPARATION OF ELONGATED NEEDLE-LIKE DIAMOND HAVING ELECTRICALLY CONDUCTIVE PROPERTIES
Kenneth A. Darrow, Sprakers, and Edwin H. Hull, Scotia, N.Y., assignors to General Electric Company, a corporation of New York
Filed Dec. 31, 1962, Ser. No. 248,788
1 Claim. (Cl. 252—502)

This invention relates to a diamond growth process wherein the growth of the diamond may be controlled to provide a predetermined diamond configuration. More particularly, this invention relates to the growth of elongated or needle-like diamond having electrically conductive properties.

Prior diamond growth, practiced as manufacturing reaction process, generally includes the subjection of a carbonaceous material such as graphite in the presence of or together with a specified catalyst or solvent, to very high pressures and temperatures in the diamond stable region of carbon on the phase diagram of carbon. After reducing the high pressure, high temperature conditions, diamonds are recovered. A specified catalyst or solvent is described as including a metal from those metals of Group VIII of the Periodic Table of Elements, chromium, manganese, and tantalum. The diamond stable region is that generally described region above the graphite to diamond equilibrium line on the known phase diagram of carbon. The described process provides diamond crystals of different sizes and shapes, as well as other physical and chemical characteristics. Any control of the particular shape of a diamond crystal is generally limited to those defined shapes that ordinarily or spontaneously occur in the known growth processes.

In order to provide a diamond of a particular shape, it is ordinarily necessary to start with a rough or uncut diamond and perform a considerable amount of, for example, cleavage, cutting, grinding, and polishing operations for the finished product. If the rough shape of the diamond closely approximates the finished shape, substantial savings are involved. Furthermore, if the rough shape diamond is inclusive of desired properties such as electrical conducting characteristics, a more unique and desirable product is obtained.

Accordingly, it is an object of this invention to provide diamond growth in predetermined shapes.

It is another object of this invention to provide a method of control of diamond shape in a diamond growth process.

It is another object of this invention to provide elongated or needle-like diamonds.

It is another object of this invention to provide an additional element to a carbonaceous material-catalyst combination to stimulate the diamond growth process.

It is another object of this invention to add boron to a carbonaceous material graphite combination to stimulate diamond growth in a needle-like configuration.

It is another object of this invention to provide an elongated or needle-like diamond having different electrically conducting characteristics along its length.

Briefly described, this invention in one form includes the addition of boron to a carbonaceous material-catalyst combination in a reaction vessel, at a particular location in the reaction vessel, so that stimulated diamond growth in the form of needle-like structures is obtained.

This invention will be better understood when taken in connection with the following description and the drawing which illustrates one preferred form of a reaction vessel to be utilized in the practice of this invention in a high pressure apparatus.

A method and apparatus utilized to grow diamonds are disclosed in U.S. Patents 2,947,610, Hall et al.; 2,947,609, Strong, and 2,941,248, Hall. While various apparatus are found in the prior art which are capable of providing the conditions for the particular processes involved, one preferred high temperature, high pressure apparatus is that referred to in U.S. Patent 2,941,248, Hall, and which is also illustrated in the appended drawing.

Referring now to the drawing, apparatus 10 includes an annular belt member 11 having a convergent divergent aperture 12 therethrough. A pair of frusto-conical oppositely positioned and movable punches 13 and 13' are positioned concentrically with aperture 12 to move into said opening to define a reaction chamber therewtih. A reaction vessel 14 containing a specimen material is placed in the reaction chamber and subjected to high pressures by motion of the punches 13 and 13' towards each other. Punches 13 and 13' are connected to a suitable source of electrical power (not shown) and an electrical resistance circuit is established through the reaction vessel. Electrical current is conducted into the reaction vessel by means of electrically conducting rings 15 and disks 16. Thereafter as current passes through the reaction vessel contents where the contents are electrically conductive or suitable heater elements are inserted therein.

A method of growing diamonds, as in U.S. Patent 2,947,610, Hall et al., utilizes a pyrophyllite reaction vessel to contain reaction materials, for example, graphite and one of the mentioned catalyst metals. This vessel is placed in the described reaction chamber and motion of the punches toward each other compresses and subjects the reaction vessel to high pressures. By connecting the punch members to a source of electrical power, a resistance circuit is provided through the punches and through the reaction vessel for resistance heating. Pressure and temperature are adjusted to provide diamond reaction conditions above the graphite to diamond equilibrium line and where the desired metal becomes molten. See "Diamond Graphite Equilibrium Line from Growth and Graphitization of Diamond," F. P. Bundy et al., "Journal of Chemical Physics," vol. 35, No. 2, pages 383–391, August 1961, and "Calibration Techniques in Ultra-High Pressures," F. P. Bundy, "Journal of Engineering for Industry," May 1961. The molten metal exerts a catalytic and solvent action on the graphite to provide diamond growth. After reduction of temperature and pressures, diamond is recovered.

One preferred reaction vessel for the practice of this invention, as illustrated in the drawing, includes means to indirectly heat the specimen material. The means includes a pyrophyllite outer cylinder 17 and an inner concentrically positioned graphite heater cylinder 18. Cylinder 18 is in contact with the disks 16 so that an electrical circuit is established between punches 13 and 13' and through the reaction vessel 14. The cross-sectional thickness of cylinder 18 may be varied to provide different resistances and temperatures for the reaction vessel contents.

A further cylinder 19 of an electrical non-conducting material such as alumina is concentrically positioned within graphite cylinder 18 to electrically insulate cylinder 18 from the reaction vessel contents or reactants. Disks 20 of alumina also electrically and thermally insulate the reactants from end disks 16. One preferred arrangement of exemplary reactants includes a cylinder 21 of graphite as the carbonaceous material, which is contained within a catalyst metal tube 22. A pair of catalyst metal end disks 23 close the ends of tube 22. The catalyst metal tube 22 consists of an iron inner tube of about 0.320 inch O.D. and 0.010 inch wall thickness, which contains both an inner and outer nickel foil liner. Disks 23 also include an inner and outer nickel foil liner. These liners are employed to provide an alloy for diamond growth. Thus, various metals and alloys in accordance with prior teachings of U.S. Patents 2,947,610 and 2,947,609 may be employed. End disks 23 may also comprise one or more disks of about 0.020 inch thickness. A more particular description of indirectly heated reaction vessels as disclosed is found in U.S. Patent 3,031,269, Bovenkerk.

In the course of numerous diamond growing processes, by the above method and apparatus, it has been observed that certain materials in the reaction vessel tend to inhibit the diamond growth process or to carry on reactions which compete with the diamond growing processes. Other materials which have been added to the growth processes have been observed not to have any noticeable effects on the diamond growth process. It has been discovered, however, that a certain material may be added to the diamond growth process to stimulate the diamond growth process to an unexpectedly and highly recognizable extent. This added material is boron. When boron is added to a diamond growth process in one of a pair of duplicate examples, the stimulation of the diamond growth process in the example which includes boron in the reactant material is overwhelmingly evident in the greater amount of diamond crystals which are grown compared to the amount which are grown in the presence of a catalyst only. The added boron also provides a blue diamond which is a very good electrical conductor. The color may vary, depending on the amount of boron added, from light to deep blue to blue-black.

It has also been further discovered that positioning the boron in certain locations or positions within the reaction vessel will lead to controlled growth conditions of the diamond so that the diamonds are obtained in elongated or needle-like form.

One preferred position for the boron is illustrated in the drawing in which a small powdered boron pellet 24 is placed in a suitable aperture provided in one end of graphite cylinder 21. When reaction vessel 14 is positioned in the apparatus as shown in the drawing and is subjected to pressures and temperatures sufficient to convert graphite 21 to diamond, for example, 65 kilobars and a temperature of 1400° C. (using a nickel-iron catalyst tube 22), diamonds which are growing in graphite cylinder 21 are grown in the boron end of the cylinder 21 in elongated or needle-like structures projecting towards the upper end of the reaction vessel. Diamond crystals as long as about 0.17 inch have been produced by this means. In general these elongated or needle-like diamonds have a length to diameter ratio of about 3 or 4 to 1. The needle or column diamonds are not randomly oriented but are generally parallel and upright in the reaction vessel. By comparison to a similar example without boron more and larger diamonds are readily observed in the process utilizing boron. Boron is thus a definite stimulator for diamond growth processes, and when positioned in minimal and specific locations provides needle-like diamond growth.

No criticality exists in the use of varying amounts of boron powder. As referred to in the above example, a boron powder pellet of 0.040 inch in diameter to 0.40 inch in length provided a plurality of deep blue needle-like diamonds. As a minimum amount of boron, it has been found that such minimum amounts must be at least a significant amount so that diamonds are caused to grow, because of the boron in the reaction vessel, in the needle-like structure as described. Repetitive operations with boron added by light dusting of a graphite rod to the mentioned 0.040 pellet provided the needle-like structure for diamonds in all respects. Boron may be provided in the range of less than about 0.1 percent to about 20 percent, by weight, of graphite. Addition of boron to more than one location diminished the length of the crystals obtained. Also, addition of excess boron provides excess random growth and few elongated diamonds.

Electrical measurements of these elongated diamonds after pre-cleaning indicate that the crystals have electrically conducting and semiconducting properties. Additionally, it has been found that the electrical characteristics vary along the longitudinal axis of the diamond as does the blue color which varies from a darker blue at the base or boron end of the reaction vessel to a light blue at the upper end.

While the following examples indicate boron addition to reaction vessel contents, other materials containing boron may be utilized in this invention. For example, those materials having boron combined therewith, i.e., alloys, boron compounds such as boron carbide, and other materials which can be reacted or decomposed under the conditions of the reaction to provide boron will stimulate the indicated reaction to provide the needle-like diamond structures.

Ordinarily, the boron added to the reaction vessel is positioned or located therein in discrete amounts in predetermined locations as opposed to random mixing of powders, chunks, etc. The practice of this invention indicates that the addition of the boron should be not only in discrete amounts but also in discrete minimum locations, preferably at one location, and where more locations are utilized, these locations should be as far apart as possible.

The boron addition provides needle-like or elongated diamond crystals quite independent of the particular choice of catalyst metal or alloy or of carbonaceous material, however, the particular arrangement of the reaction vessel contents may limit such growth. For example, placing a horizontal disk of catalyst material about mid-length in the reaction vessel of the drawing provides needle-like growth from the disk vertically in each direction. This growth detracts from the growth obtainable in diamond grown in the reaction vessel of the drawing without the said disk. Thus, a preferred practice of this invention utilizes a cylindrical section of a reaction vessel filled with graphite and with boron at one end. A preferred form and arrangement of catalyst metal is a tube 22 or long vertical strips, and spaced or positioned so that a free vertical center section of graphite is defined for unobstructed diamond growth.

The following examples are illustrative of preferred practices of this invention. Each example is one chosen from a group of like examples with some variation in pressures and temperatures.

*Example 1*

The reaction vessel as described for the drawing was assembled with a 0.001 inch thick nickel foil lining covering tube 22 and disks 23. Cylinder 21 was a sprectroscopic purity graphite rod of about 0.80 inch length. Before assembly of the disks 23, a small amount of boron powder was lightly dusted across the end surface of the graphite rod 21. The reaction vessel was then placed in the apparatus of the drawing and as described and subjected to elevated pressures and temperatures. Pressure was raised to the range of 45 to 60 kilobars and temperature was raised to just below the melting temperature of nickel, i.e., from about 1200 to 1300° C. These conditions were maintained for about 25 minutes as a conditioning period. Thereafter, temperature was increased to about 1400° C. and these latter conditions maintained for about 50 minutes. During this period, the force applied to the punches was increased in small increments to offset pressure losses and perhaps to provide a small increase in pressure. The effect is believed to be a constant or slowly rising pressure curve in the established limits. Thereafter, the temperature and pressure were decreased and the reaction vessel removed from the apparatus. The end of the reaction vessel where the boron powder was placed was filled with needle-like diamond growing from the end disk toward the center of the reaction vessel. Many of these diamonds were at least 0.010 inch length with a length-to-diameter ratio of at least 3 to 1.

Example 2

The general arrangement and procedure of Example 1 were employed except that a pressed boron powder pellet of about 0.040 inch diameter and 3/16 inch length was positioned in a similar sized aperture provided centrally in one end of graphite rod 21. The conditioning period was maintained at about 50 to 60 kilobars and between 1200 to 1300° C. for about 25 minutes. Thereafter, temperature was raised to 1400° C., i.e., above the melting point of the iron-nickel catalyst and maintained for about 100 minutes. Temperature and pressure were decreased and the reaction vessel removed from the apparatus, tube 22 was found to contain several elongated diamonds as in Example 1. The longest such diamond was about 0.17 inch in length.

Example 3

The arrangement and procedure of Example 1 were followed. Both ends of graphite rod 21 were lightly dusted with boron powder. All other conditions were similar to those of Example 1. In this reaction vessel, elongated diamonds were found in each end of the tube 22. However, the total length of a diamond from both ends just about equaled the length of a diamond taken from an Example 1 reaction vessel where boron was placed in only one end.

Example 4

The arrangement and procedure of Example 2 were followed with the exception that a boron pellet was placed in each end of graphite rod 21. The procedure of Example 2 was followed and the reaction vessel was found to contain needle-like diamonds as characterized by those of Example 3.

Example 5

The arrangement and procedure of Example 4 were repeated except that rod 21 was separated to receive an iron nickel disk of 0.280 inch diameter horizontally thereof. Diamonds grow vertically from each side of the disk as well as from the ends of the rod. Elongated diamonds were found to be much shorter than those of Example 4.

Example 6

In this example a 0.001 inch thick palladium foil lined graphite tube replaced tube 22 of the drawing. Within the internal foil lined tube there were positioned in stacked relationship four equal cylinders of graphite. The three interfaces of the graphite cylinders were dusted with boron powder. Between each of the interfaces there was positioned an assembly comprising two 0.005 inch thick 40 percent nickel-60 percent manganese alloy disks with an 0.0015 inch thick intermediate iron disk. Pressure and temperature were above about 50 kilobars and 1200° C., respectively. These conditions were maintained for about 20 minutes. The diamonds recovered were of a short needle-like configuration similar to those of Example 5.

From these and other examples as practiced in accordance with the teachings of this invention, it can be seen that the addition of boron to a diamond reaction stimulates the reaction. Repetition of the examples without boron may provide somewhat elongated diamonds, however, diamonds grown without boron were not comparable in length to the boron containing product. By far the longest diamonds are grown where boron is positioned in one end of the reaction vessel only, and the practice and procedure of Examples 1 and 2 are followed. Minimum amounts of boron are desired for better crystal formation so that light dusting of the pellet of Example 2 is preferred.

While a specific method and apparatus in accordance with this invention is described and shown, it is not intended that the invention be limited to the particular description nor to the particular configurations illustrated, and it is intended by the appended claim to cover all modifications within the spirit and scope of this invention.

What we claim as new and desire to secure by Letters Patent of the United States is:

In a diamond growing process wherein carbonaceous material and a catalyst are simultaneously subjected to high pressures and high temperatures in a reaction vessel to convert said carbonaceous material to diamond with said reaction vessel and contents thereof being held at operating pressure and a temperature slightly below the melting temperature of said catalyst at said operating pressure for a period of time and then heated to raise the temperature of the contents of said reaction vessel above the melting temperature of the catalyst, the improvement comprising:
  (a) placing a significant amount of boron material only in the end region of the reaction vessel,
    (1) said boron material being a substance from which boron atoms are released under operating pressure and temperature conditions, and
  (b) increasing in small increments the pressure applied to said reaction vessel throughout the heating of the contents of said reaction vessel above the melting temperature of the catalyst in order to at least offset pressure losses within said reaction vessel,
whereby the diamond-making reaction is conducted and needle-like diamonds having electrically conducting properties are produced.

References Cited by the Examiner

UNITED STATES PATENTS

| | | | |
|---|---|---|---|
| 3,031,269 | 4/1962 | Bovenkerk | 23—209.1 |
| 3,142,595 | 7/1964 | Wentorf | 23—209.1 X |
| 3,148,161 | 9/1964 | Wentorf et al. | 252—502 |

MILTON WEISSMAN, *Primary Examiner.*

OSCAR R. VERTIZ, *Examiner.*

E. J. MEROS, *Assistant Examiner.*